United States Patent [19]
Kinane et al.

[11] Patent Number: 6,155,330
[45] Date of Patent: Dec. 5, 2000

[54] METHOD OF SPRAY FORMING METAL DEPOSITS USING A METALLIC SPRAY FORMING PATTERN

[75] Inventors: Jeffrey Alan Kinane, Birmingham, Mich.; Grigoriy Grinberg, Sylvania, Ohio; David Robert Collins, Southgate; Paul Earl Pergande, Beverly Hills, both of Mich.

[73] Assignee: Visteon Global Technologies, Inc., Dearborn, Mich.

[21] Appl. No.: 09/186,031

[22] Filed: Nov. 4, 1998

[51] Int. Cl.[7] ............................. B22C 7/02; B22D 23/00
[52] U.S. Cl. ................................. 164/19; 164/35; 164/46
[58] Field of Search ................................. 164/6, 19, 34, 164/35, 45, 46

[56] References Cited

U.S. PATENT DOCUMENTS

| | | | |
|---|---|---|---|
| 2,250,246 | 7/1941 | Axline et al. | 164/19 X |
| 2,280,864 | 4/1942 | Stossel | 164/19 |
| 2,280,865 | 4/1942 | Stossel | 164/19 X |
| 2,280,866 | 4/1942 | Stossel | 164/19 |
| 2,288,658 | 7/1942 | Stossel | 164/19 |
| 2,293,571 | 8/1942 | Stossel | 164/19 X |
| 3,506,057 | 4/1970 | Pennock et al. | 164/46 X |
| 4,231,982 | 11/1980 | Jansson . | |
| 5,079,974 | 1/1992 | Weiss et al. . | |
| 5,460,851 | 10/1995 | Jenkins et al. . | |
| 5,476,222 | 12/1995 | Singer et al. . | |
| 5,516,586 | 5/1996 | Singer et al. . | |
| 5,634,593 | 6/1997 | Jenkins . | |
| 5,635,096 | 6/1997 | Singer et al. . | |
| 5,658,506 | 8/1997 | White et al. . | |
| 5,718,863 | 2/1998 | McHugh et al. . | |
| 5,746,966 | 5/1998 | McDonald . | |

FOREIGN PATENT DOCUMENTS

| | | | |
|---|---|---|---|
| 24 45 641 | 4/1976 | Germany | 164/19 |
| 2294227 | 4/1996 | United Kingdom . | |
| WO 96/09421 | 3/1996 | WIPO . | |

*Primary Examiner*—J. Reed Batten, Jr.
*Attorney, Agent, or Firm*—Charles H. Ellerbrock

[57] ABSTRACT

A spray forming pattern of a first metal having a melting point at a first temperature is formed. The spray forming pattern has a surface defining a cavity that has the shape of a master pattern. Steel particles having a carbon content in the range of 0.01–0.9% by weight are sprayed onto the spray forming pattern to form a deposit on the spray forming pattern. The deposit has a thickness of at least 0.5 inches and the temperature of the steel particles increases as the thickness of the steel deposit increases. The spraying conditions are controlled so that the steel particles coming into contact with the spray forming pattern results in a surface temperature of the spray forming pattern of less than about 80° C. The deposit and the spray forming pattern are heated to a second temperature, which is higher than the first temperature, to melt the spray forming pattern from the deposit. The resulting deposit has the general shape of the master pattern.

7 Claims, 2 Drawing Sheets

METHOD OF SPRAY FORMING METAL DEPOSITS USING A METALLIC SPRAY FORMING PATTERN

TECHNICAL FIELD

The present invention relates to the making of prototype tools, and more particularly to a method of spray forming of metal deposits.

BACKGROUND ART

Spray forming has become an accepted technique for producing steel prototype tooling (such as dies or molds) in a fraction of the time needed to make steel tooling conventionally. Spray forming techniques up to date have typically involved the following steps: (i) casting and solidifying a ceramic spraying pattern about a plastic master pattern of the tool to be produced; (ii) spraying metallic particles onto the ceramic pattern; (iii) allowing the sprayed metallic particles to cool thereby forming a metal deposit having the general shape of the master pattern; and (iv) separating the metal deposit from the ceramic mold pattern.

While the above method produces acceptable deposits, the method is relatively time consuming and expensive. For instance, it can take up to four days to form the ceramic spraying pattern. Also, the removal of the deposit from the ceramic spraying pattern is a relatively tedious and time consuming procedure. It usually requires a cutting device, such as a water jet, to first remove the majority of the ceramic spraying pattern from the deposit. Then the smaller ceramic pieces remaining on the deposit are chiseled from the deposit. Then the deposit is bead blasted to insure that all of the ceramic is removed. Accordingly, it is an object of the present invention to provide a method of making metal deposits which can be used for steel prototype tooling which is less expensive and less time consuming than existing processes.

DISCLOSURE OF INVENTION

The invention meets the above object and others by providing a method of spray forming a metal deposit. The method comprises (a) providing a master pattern; (b) forming a spray forming pattern of a first metal having a melting point at a first temperature, the spray forming pattern having a surface which defines a cavity having the shape of the master pattern; (c) spraying metal particles, different from the first metal, onto the spray forming pattern to form a deposit on the spray forming pattern; and (d) heating the deposit and the spray forming pattern to a second temperature, higher than the first temperature, to melt the thermal spraying mold from the deposit, the resulting deposit having the general shape of the master pattern.

BRIEF DESCRIPTION OF INVENTION

FIG. 1 is a schematic flow diagram of the processing steps of the present invention; and FIG. 2 is a schematic illustration of an apparatus used in one of the processing steps of FIG. 1.

DETAILED DESCRIPTION AND BEST MODE

The method of the present invention comprises at least four basic steps: (a) providing a master pattern; (b) forming a spray forming pattern of a first metal having a melting point at a first temperature, the spray forming pattern having a surface which defines a cavity within the spray forming pattern, the cavity having the general shape of the master pattern; (c) spraying metal particles, different than the first metal, onto the spray forming pattern to form a deposit on the spray forming pattern; and (d) heating the deposit and the spray forming pattern to a second temperature, higher than the first temperature, to melt the spray forming pattern from the deposit, the resulting deposit having the general shape of the master pattern.

Figure 1:
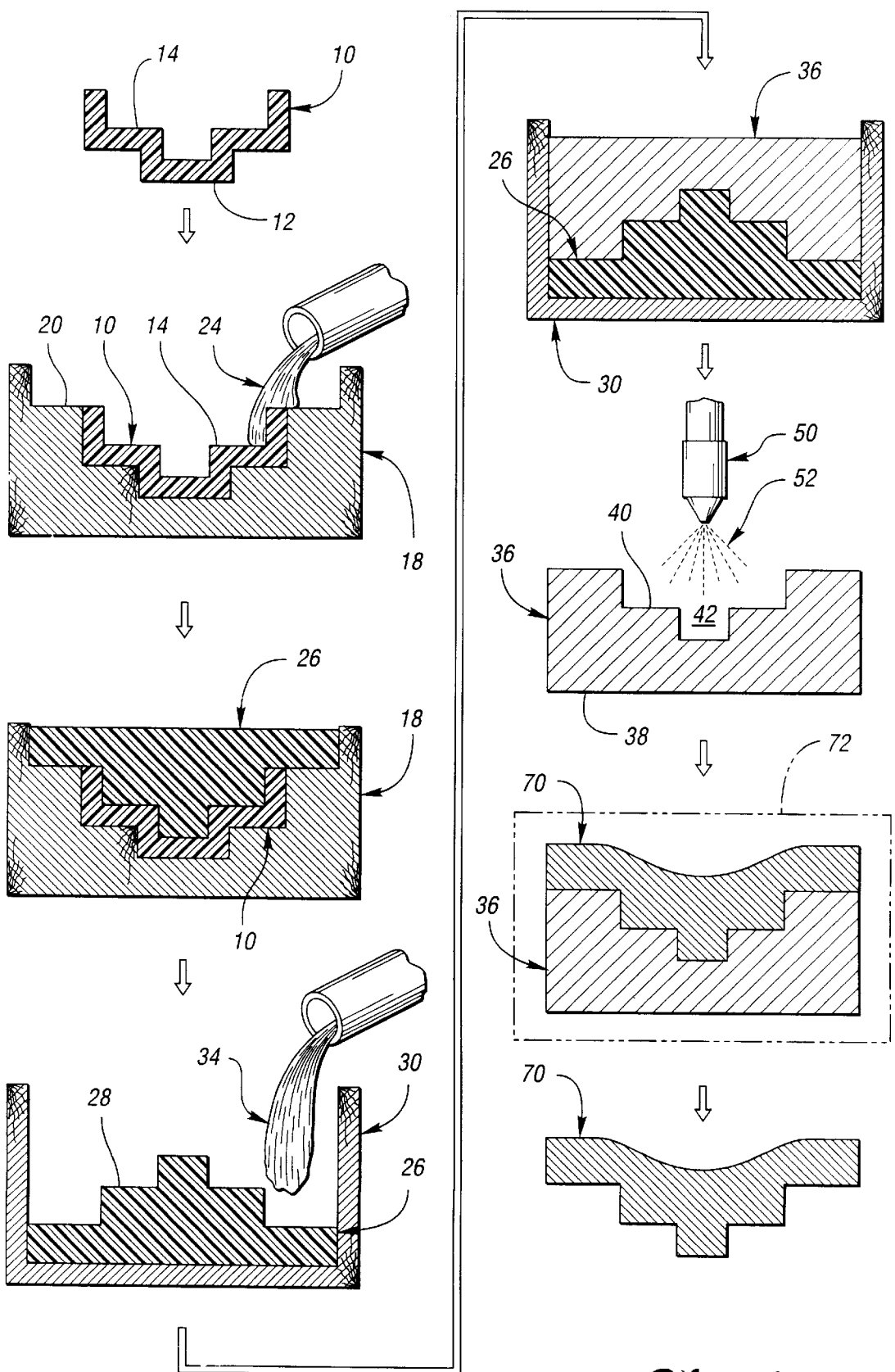

The master pattern 10, shown schematically in FIG. 1, is preferably polymeric and may be created using solid-free form fabrication techniques controlled by a CAD/CAM model. Free-formed fabrication can comprise stereolithography, cubital, laminated or foam object manufacturing, 3-D printing and stratified extrusion. Stereolithography is preferred because it creates a plastic pattern directly from a vat of liquid photocurable polymer through selective solidification using a scanner laser beam. The master pattern 10 could also be milled, or otherwise formed, out of wood, metal, laminate materials, renboard, etc.

The master pattern 10 is essentially defined by a base surface 12 and an upper surface 14. Since the master pattern 10 is relatively weak, a more durable pattern should preferably be made for practicing the present invention. A non-limiting method for preparing a relatively durable pattern, is to cast a casting mold having the general shape of the master pattern.

A preferred method for preparing a casting mold comprises placing the master pattern 10 in a casting holder 18. The casting holder 18 has a receiving surface 20 which has the same contour as the base surface 12 of the master pattern 10 for supporting the master pattern 10. A liquified polymeric material 24 is then poured into the casting holder 18 about the plastic master pattern 10. The polymeric material, after it solidifies, forms a casting mold 26 which has a periphery, or outer surface 28, which closely resembles the upper surface 14 of the master pattern 10.

The liquid polymeric material 24 which can be used to form the casting mold 26 can be made of any suitable polymer known in the art which will form a relatively durable article when solidified and can withstand the first temperature without degradation or melting. Examples of suitable polymers include, but are not limited to, epoxies, polyurethanes, polyacrylates, unsaturated polyesters, and silicones. The casting mold 26 may include a reinforcing material, such as glass, which is mixed in with the liquid polymeric material 24. A particularly preferred casting mold 26 is made from a 2-part laminate available from Ceiba Geigy and comprises an epoxy gel coat and a laminate having glass strands in an epoxy matrix. The casting mold 26 could also be milled, or otherwise formed, out of wood, metal, resinboard, etc.

The casting mold 26 is then removed from the casting holder 18 and placed in an open box 30 (laminated wood). In the casting step above, a release agent, such as silicone or wax, is preferably applied to the upper surface 14 of the master pattern 10 and the casting holder 18 prior to the pouring of the liquid polymeric material 24 to help facilitate the removal of the casting mold 26 from the master pattern 10 and the casting holder 18.

A liquified metallic material 34 is then poured into the box 30 and allowed to solidify around the casting mold 26 to form a spray forming pattern 36. The liquified metallic material which can be used to form the spray forming pattern 36 can be made of any suitable metal which has a melting point temperature below about 500° C., more preferably about 250° C., and most preferably about 150° C. Employing the use of a metal having a melting point above about 500° C. is not desirable since dimensional inaccuracy and/or surface oxides could arise at temperatures above about 500° C.

Examples of suitable metals for use as the liquid metallic material include, but are not limited to, tin, lead, zinc, their alloys, and alloys of aluminum. A particularly preferred liquidified metallic material is an alloy of tin-bismuth, and most preferably liquified METSPEC-281 from MCP (Mining and Chemical Products) of Fairfield, Connecticut. METSPEC-281 is particularly preferred because it has a melting point temperature of about 138.5° C. and has a "negligible material shrink." A "negligible material shrink" is desirable to help prevent problems associated with shrinkage of metal upon cooling from an elevated temperature.

After the metal solidifies, the spray forming pattern 36 is then removed from the box 30 and the casting mold 26. Preferably, a release agent is applied to the outer surface 28 of the casting mold 26 prior to the pouring of the metal liquified metallic material 34 into the box 30. The spray forming pattern 36 has a base surface 38 and an upper surface 40 which has the shape of upper surface 14 of the master pattern 10. The upper surface 40 of the spray forming pattern 36 defines a cavity 42. The upper surface 40 has the same contour as the upper surface 14 of the master pattern 10. The spray forming pattern 36 is then ready for use as a receptor for metal spray forming.

Thermal spray guns 50, shown schematically in FIG. 1, are utilized to spray metallic particles 52 onto the spray forming pattern 36 and, in particular into the cavity 42. The thermal spray guns 50 may be of the oxy-acetylene flame type in which a wire or powder metal is fed thereinto, a plasma into which powder metal is fed, or preferably one or two wire arc type, in which the tip of the wires is fed into the arc. Cold spraying guns could be used in place of thermal spraying guns 50 to spray metallic particles onto the spray forming pattern 36.

In a two wire arc spray gun, an electric arc is generated in a zone between two consumable wire electrodes; as the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon.

In a single wire arc apparatus, a single wire is fed either through the central axis of the torch or is fed at an acute angle into a plasma stream that is generated internally within the torch. The single wire acts as a consumable electrode that is fed into the arc chamber. The arc is established between the cathode of the plasma torch and the single wire as an anode, thereby melting the tip of the wire. Gas is fed into the arc chamber, coaxially to the cathode, where it is expanded by the electric arc to cause a highly heated gas stream (carrying metal droplets from the electrode tip) to flow through the nozzle. A further higher temperature gas flow may be used to shroud or surround the spray of molten metal so that droplets are subjected to further atomization and acceleration.

Yet still other wire arc torch guns may be utilized that use a transferred-arc plasma whereby an initial arc is struck between a cathode and a nozzle surrounding the cathode; the plasma created from such arc is transferred to a secondary anode (outside the gun nozzle) in the form of a single or double wire feedstock causing melting of the tip of such wire feedstock.

Figure 2:
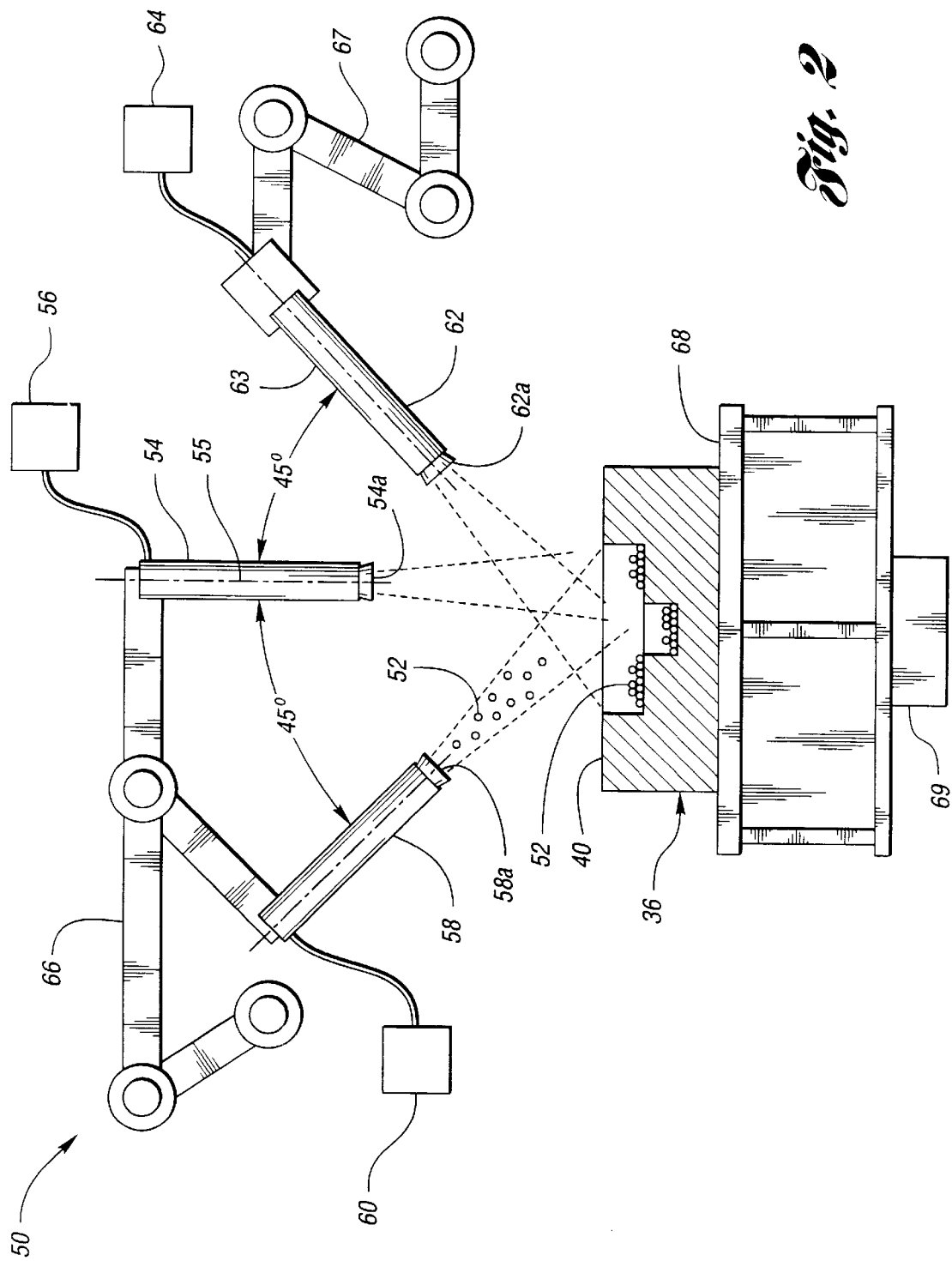

In a preferred embodiment as shown in FIG. 2, three guns are utilized to lay down the metal particles on the spray forming pattern 36. A first thermal spray gun 54 has a gun tip 54a which is oriented along an axis 55 perpendicular to the general planar extent of the upper surface 40 of the spray forming pattern 36, the tip 54a being arranged generally about 7 to 14 inches from surface 40. The spray gun 54 has a power supply 56 operated at a voltage of about 30.

A second gun 58 is carried so that its gun tip 58a is oriented at an angle of about 45° from the first gun axis 55 and has a power supply 60 operated at about 30 volts. The gun tip 58a is also placed about 7 to 14 inches to the exposed surface 40.

The third spray gun 62 has a gun tip 62a oriented so that its axis 63 is also at a 45° angle with respect to the axis 55 of the first gun and lies in a plane that is generally perpendicular to the plane encompassing guns 54 and 58. The third gun 62 has a power supply 64 operated continuously at about 30 volts. The guns tip 62a is held at a position of about 7 to 14 inches from the upper surface 40.

Each of the guns 54, 58 and 62 is supplied with a high pressure gas from their respective supplies consisting of nitrogen, air, or a mixture thereof at a pressure of about 40 to 120 psi.; such gas being utilized to affect the atomization of the wire droplets. In typical metal spraying operations, the metal is being deposited onto a ceramic pattern and the current supply of the thermal guns are about 175 amperes. Since the metal spray forming pattern 36 has a melting point temperature of less than about 500° C., the amperage of the thermal spray guns 54, 58 and 62 must be low enough that the temperature of the surface 40 of the pattern 36 during the spray forming step be less than, or essentially equal to, the melting point of the metal used to form the pattern 36. The surface temperature of the pattern 36 during the spray forming step is essentially dependent upon the temperature of the metallic particles deposited thereon, which is largely dependent upon the operating parameters of the guns 54, 58 and 62. When the metallic material of the pattern 36 has a melting point temperature of about 138.5° C., as in the case of the METSPEC-281 alloy, the current supply of the spray guns 54, 58 and 62 should be maintained at about 80–120 amperes.

The guns 54, 58 and 62 may be moved robotically, such as by robots 66 and 67, and the spray forming pattern 36 may be mounted on a turntable 68 and rotated by a motor 69 to achieve relative movement between the spray pattern of the guns and the surface 40; repeated passes of the spray material will deposit a bulk deposit 70 (FIG. 1) having a thickness of at least about 0.5 inches, and preferably between about 1.5–2 inches on the surface 40.

The thermal spraying step preferably lasts for about three hours and results in deposits 70 having a thickness of between about 1.5 to about 2.0 inches, for deposits of about 2 feet by 2 feet. Larger sized deposits may require thicker sections and more passes.

While it is important that the surface temperature of the spray forming pattern 36, and thus preferably the temperature of the metal particles being deposited on the spray forming pattern 36, be preferably less than the melting point temperature of the material used to form the pattern 36, it is not necessary that the surface temperature of the pattern 36, or the temperature of the deposited metal particles, be less than the melting point of the material used to form the pattern. This is because, as the thickness of the forming deposit 70 increases, a buffer of metal is formed on the pattern 36 which operates as a "heat buffer" to shield the underlying pattern 36 from the thermal effects of the deposited metallic particles. Effectively, after an initial layer of metal of sufficient thickness is formed over the pattern 36, the pattern 36 will be less susceptible to the thermal effects of the metallic particles. Accordingly, as the thickness of the forming deposit 70 increases, the temperature of the deposited metallic particles may increase over the melting point temperature of the metal forming the pattern 36 without melting the pattern 36. It should also be noted that the pattern 36, because of its metallic nature, acts as a heat sink by quickly transferring heat generated during the thermal spraying away from the surface 40 of the pattern 36, dissipating it throughout the entire pattern 36 and any metallic fixtures in contact with the pattern 36.

Preferably, when a metal having a melting point temperature of about 135° C. is used to form the pattern 36, the currents of the thermal spray guns are maintained between about 80–120 amperes, and preferably 100 amperes, for about 30 minutes at the onset of the thermal spraying step, or for a period of time sufficient to result in a layer of deposited metal particles of about 1/16th inch to about 1/8th inch. The surface temperature of the spray forming pattern 36, when spraying about 0.8% carbon steel, is less than about 80° C., and preferably about 37° C. to about 66° C. as measured by Infrared Pyrometer, at a current of about 80–120 amperes. After, the initial layer of metallic particles is formed, the current of the thermal spray guns may be incrementally ramped up as desired.

The wire feedstock utilized for each of the guns has a chemistry that consists of steel with carbon in the range of 0.01 to 0.9% by weight. The melting point temperature of carbon steel is about 1500° C.

The deposit 70 is then removed from the spray forming pattern 36 by heating the deposit 70 and pattern 36, preferably in an oven 72, to a temperature which is higher than the melting point of the metal used for forming the pattern 36. In the case of METSPEC-281, this temperature is at about 138.5° C. The temperature in the oven 72 must also be low enough not to melt or degrade the deposit 70. The resulting separated deposit 70 is an exact negative of the pattern 36 and then can be used as a die or mold part accordingly.

The use of the metal to form the spray forming pattern 36 rather than ceramic, as was done conventionally in the prior art, allows the process of the present invention to save time relative to the conventional process since it can take up to four days to prepare the ceramic pattern whereas the metal spray forming pattern 36 can be prepared in as little as four hours. Also, a cost savings can be realized in that the metal for making the spray forming pattern 36 can be reused after it has been melted. Whereas in the prior art, once the ceramic has been removed from the deposit, the ceramic is thereafter not reusable.

While the best modes for carrying out the invention have been described in detail, those familiar with the art to which this invention relates will recognize various alternative designs and embodiments for practicing the invention as defined by the following claims.

What is claimed is:

1. A method of spray forming a metal deposit that replicates a master pattern, said method comprising the steps of:

(a) providing the master pattern;

(b) forming a spray forming pattern of a first metal having a melting point at a first temperature, said spray forming pattern having a surface defining a cavity within the spray forming pattern, said cavity having the shape of the master pattern;

(c) spraying steel particles having a carbon content in the range of 0.01–0.9% by weight onto said spray forming pattern to form a steel deposit on said spray forming pattern, said deposit having a thickness of at least 0.5 inches, the temperature of the steel particles increasing as the thickness of said steel deposit increases;

(d) controlling said spraying step (c) so that the steel particles coming into contact with said spray forming pattern result in a surface temperature of said spray forming pattern of less than about 80° C.; and (e) heating said deposit and said spray forming pattern to a second temperature, higher than said first temperature, to melt said spray forming pattern from said deposit, said deposit having the general shape of the master pattern.

2. The method of claim 1 wherein said first temperature is less than about 500° C.

3. The method of claim 2 wherein said first metal is an alloy of tin and bismuth.

4. The method of claim 1 wherein said step (b) of forming a spray forming pattern comprises preparing a casting mold having the general shape of the master pattern, placing the casting mold in a container, pouring the first metal in liquid form into the container around the casting mold, and allowing the first metal to solidify to form the spray forming pattern.

5. The method of claim 1 wherein an oven is provided for said heating step (d).

6. The method of claim 1 wherein said controlling of said spraying step (c) comprises employing the use of a plurality of wire arc torch guns to spray the steel particles, the guns operating at a voltage of about 30 and a current between about 80–120 amperes during at least a portion of said spraying step (c).

7. The method of claim 6 wherein the current is increased from a first ampere value towards a second ampere value, higher that the first ampere value, during said spraying step (c).

* * * * *